United States Patent [19]

Michalski et al.

[11] 3,893,941
[45] July 8, 1975

[54] FOAM INHIBITING COMPOSITION

[75] Inventors: Raymond J. Michalski, Riverdale; Chappelle C. Cochrane, Maywood, both of Ill.

[73] Assignee: Nalco Chemical Company, Oak Brook, Ill.

[22] Filed: July 11, 1973

[21] Appl. No.: 378,378

Related U.S. Application Data

[62] Division of Ser. No. 179,161, Sept. 9, 1971, Pat. No. 3,772,207.

[52] U.S. Cl. .................. 252/358; 162/60; 162/72; 252/314; 252/321
[51] Int. Cl. .......................................... B01d 19/04
[58] Field of Search ............................ 252/321, 358

[56] References Cited
UNITED STATES PATENTS 2,854,417  9/1958  Edwards et al. .................. 252/358
3,388,072  6/1968  Domba ........................... 252/358 X
3,730,912  5/1973  Inamorato ....................... 252/358 X

*Primary Examiner*—Richard D. Lovering
*Attorney, Agent, or Firm*—Johnston, Keil, Thompson & Shurtleff

[57] ABSTRACT

Compositions are provided containing synergistic amounts of both a long chain hydrocarbon substituted amide which is water insoluble and a water insoluble saponified copolymer of ethylene and polyvinyl acetate, homogeneously dispersed in a water insoluble hydrocarbon oil in which said amide and said copolymer are insoluble, preferably together with a surface active spreading agent, which are useful in controlling foams in aqueous systems having a pH of 1 to 7.5, especially sulfite wood pulp liquor.

3 Claims, No Drawings

FOAM INHIBITING COMPOSITION

This application is a division of U.S. application Ser. No. 179,161 filed Sept. 9, 1971, now matured into U.S. Pat. No. 3,772,207.

BACKGROUND

Many difficulties have been encountered in controlling foams in aqueous systems, especially in sulfite wood pulp systems and in aqueous systems which are acidic. In sulfite wood pulp systems, the treated pulp is usually washed and then passed through screens to remove the fibers. Foaming occurs during washing and screening, especially the latter. Such foaming complicates the separation of the fibers and therefore it is desirable to alleviate it and to do so as effectively and inexpensively as possible.

In the past various types of chemicals have been used for this purpose but there has been a need for more effective control of such foams with a minimum of expense.

OBJECTS

One of the objects of the present invention is to provide a new and improved process and new and improved compositions for controlling foaming in aqueous systems, especially in sulfite wood pulp systems and in aqueous systems in which the pH is usually within the range of 1 to 7.5. Other objects will appear hereinafter.

BRIEF SUMMARY OF THE INVENTION

In accordance with the invention a process is provided for controlling foaming of an aqueous system having a pH within the range of 1 to 7.5 which normally tends to foam, and especially a sulfite wood pulp system, by adding to said system a small but sufficient amount to control said foam of both (A) a long chain water insoluble, oil insoluble amide having one or more hydrogen atoms attached to the amide nitrogen atom substituted by a hydrocarbon group containing six to 24 carbon atoms, and (B) a water insoluble, oil insoluble copolymer of ethylene and polyvinyl acetate having a weight average molecular weight within the range of 300 to 1,000 which has been saponified to replace acetate groups by hydroxyl groups, homogeneously dispersed in (C) a water insoluble hydrocarbon oil, preferably with the addition of a sufficient amount of a surfactant having a relatively low HLB value within the range of 8 to 12 to act as a spreading agent for said composition in said aqueous system, the proportions of said amide and said copolymer being sufficient to give a synergistic effect in controlling such foaming and the weight ratio of A to B normally being within the range of 5:1 to 1:5.

The invention also provides foam inhibiting compositions for inhibiting foaming in aqueous systems having a pH within the range of 1 to 7.5 comprising the aforementioned ingredients usually in proportions of 2 to 10 parts by weight of (A), 2 to 10 parts by weight of (B), and 65 to 90 parts by weight of (C), together with a sufficient amount of a surfactant having an HLB value within the range of 8 to 12 to act as a spreading agent for said composition in said aqueous system, with the weight ratio of A to B usually within the range of 5:1 to 1:5.

DETAILED DESCRIPTION OF THE INVENTION

Examples of long chain water insoluble, oil insoluble amides employed for the practice of the invention are those having the following formulae:

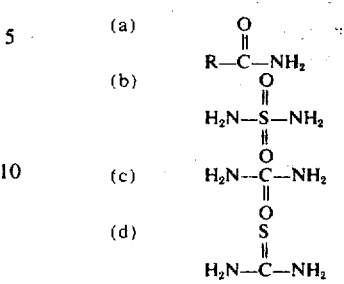

where R is a hydrocarbon group containing six to 24 carbon atoms, and in which at least one hydrogen atom of (b), (c), and (d) is substituted by a hydrocarbon group containing six to 24 carbon atoms and a hydrogen atom of (a) can be substituted by a hydrocarbon group. Specific examples are dodecylsulfamide, tetradecyl sulfamide, hexadecyl sulfamide, octadecyl sulfamide, N,N'-ditetradecyl sulfamide, N,N'-dihexadecyl sulfamide, N,N'-dioctadecyl sulfamide, N,N'-didodecyl sulfamide, N,N'-didecyl sulfamide, decyl sulfamide, N,N'-dicyclohexyl sulfamide, cyclohexyl sulfamide, behenamide, stearamide, erucamide, oleamide, palmitamide, monodecyl urea, monododecyl urea, monotetradecyl urea, monohexadecyl urea and monooctadecyl urea, and the corresponding thioureas.

It will be recognized that behenamide corresponds to formula (a) above in which R is a saturated hydrocarbon group containing 22 carbon atoms. The sulfamides correspond to formula (b) in which the hydrogen atoms are substituted by one or more saturated or unsaturated hydrocarbon groups containing six to 24 carbon atoms. The ureas correspond to formula (c) and the thioureas correspond to formula (d) in which one or more hydrogen atoms are substituted with saturated or unsaturated hydrocarbon groups containing six to 24 carbon atoms.

Copolymers of ethylene and polyvinyl acetate of the type described are commercially available materials which can be saponified with alkalis, for example, with sodium hydroxide or potassium hydroxide to replace the acetate groups by hydroxyl groups.

The amides (A) and the copolymers (B) are not significantly soluble in either water or oil and for all practical purposes can be described as being both water insoluble and oil insoluble.

The hydrocarbon oil (C) can be, for example, a paraffin oil or a mixture of paraffin oil and mineral seal oil.

The surfactant having a relatively low HLB value can be, for example, polyethylene glycol 400 dioleate.

In the practice of the invention it is preferable to homogenize the foregoing ingredients in order to prepare a foam inhibiting composition in which discrete particles of the amide and the copolymer are finely dispersed in the hydrocarbon oil which also contains a spreading agent of the type previously described. This dispersion is preferably effected by heating the ingredients together to a temperature of at least 90°C. for at least 1 hour and then cooling and simultaneously homogenizing the resultant mixture.

The foam inhibiting composition is employed for controlling foaming of an aqueous system having a pH within the range of 1 to 7.5 which normally tends to foam as, for example, in a sulfite pulp system, by adding to such system a foam inhibiting amount of such composition which is usually within the range of 0.1 to 2 pounds per ton of pulp. The foam inhibiting composition can be added to various portions of the system, for example, in the pulper, washer, and/or screener.

The invention will be further illustrated but is not limited by the following example in which the quantities are by weight unless otherwise indicated.

EXAMPLE

The following ingredients were used in preparing a foam inhibiting composition:

| Ingredients | Parts by Weight |
|---|---|
| Behenamide | 3 |
| *Saponified copolymer of ethylene and vinyl acetate having an average molecular weight of approximately 400 | 25 |
| Paraffin oil | 69 |
| Polyethylene Glycol 400 Dioleate | 3 |

*containing 25% by weight saponified copolymer and the remainder mineral seal oil.

The polyethylene glycol 400 dioleate and the paraffin oil were added to a reactor and heating to 90°C. was begun with mixing. The saponified copolymer of ethylene and vinyl acetate and the amide were added during the heating stage and the mixture was held at 90° to 95°C. for 1 hour.

The mixture was then cooled with simultaneous recirculation through a homogenizer. The resultant product had a specific gravity of .852, weighed about 7.1 pounds per gallon, had a viscosity at 70°F. of 75 centipoises, a pour point below 5°F., a freeze point below 5°F., a creamy opaque color, and a flash point above 200°F.

Small amounts of this product in the range of 0.1 to 2 pounds per ton of pulp effectively reduce foaming when added to the screener in screening pulp from sulfite pulp liquor.

In the foregoing example good results are also obtained by substituting monododecyl urea for the behenamide. Similarly, any of the other amides previously mentioned can be substituted for the behenamide.

The invention is especially valuable for controlling foaming in aqueous systems such as sulfite wood pulp systems which are usually quite acidic. They are not recommended for sulfate pulp systems which are highly alkaline.

The invention is hereby claimed as follows:

1. A foam inhibiting composition for inhibiting foaming in aqueous systems having a pH within the range of 1 to 7.5 comprising:

| | Ingredients | Parts by Weight |
|---|---|---|
| (A) | A long chain water insoluble, oil insoluble amide having one or more hydrogen atoms attached to the amide nitrogen atom substituted by a hydrocarbon group containing 6 to 24 carbon atoms, said amide being selected from the group consisting of sulfamides, ureas and thioureas, | 2–10 |
| (B) | A water insoluble, oil insoluble copolymer of ethylene and polyvinyl acetate having a weight average molecular weight within the range of 300 to 1000 which has been saponified to replace acetate groups by hydroxyl groups | 2–10 |
| (C) | A water insoluble hydrocarbon oil | 65–90 | and a sufficient amount of a surfactant having an HLB value within the range of 8 to 12 to act as a spreading agent for said composition in said aqueous system, the weight ratio of (A) to (B) being within the range of 5:1 to 1:5.

2. A composition as claimed in claim 1 in which (A) is monododecyl sulfamide.

3. A composition as claimed in claim 1 in which (A) is monododecyl urea.

* * * * *